US012461869B2

(12) United States Patent
Gurrala et al.

(10) Patent No.: US 12,461,869 B2
(45) Date of Patent: Nov. 4, 2025

(54) ADJUSTABLE PERIODICITY OF BURST ACCESS OPERATIONS

(71) Applicant: Micron Technology, Inc., Boise, ID (US)

(72) Inventors: Praveen Gurrala, Boise, ID (US); Aniket Bhandare, Boise, ID (US); John Todd Elson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 44 days.

(21) Appl. No.: 18/402,566

(22) Filed: Jan. 2, 2024

(65) Prior Publication Data

US 2024/0232103 A1 Jul. 11, 2024

Related U.S. Application Data

(60) Provisional application No. 63/478,555, filed on Jan. 5, 2023.

(51) Int. Cl.
*G06F 13/16* (2006.01)
*G06F 13/28* (2006.01)

(52) U.S. Cl.
CPC .......... *G06F 13/1689* (2013.01); *G06F 13/28* (2013.01); *G06F 13/1668* (2013.01)

(58) Field of Classification Search
CPC ............. G06F 13/1689; G06F 12/0879; G06F 13/28–34; G06F 13/1668
See application file for complete search history.

(56) References Cited

U.S. PATENT DOCUMENTS

| 2007/0115751 A1* | 5/2007 | Kim ..................... G11C 7/12 |
| | | 365/233.17 |
| 2012/0087201 A1* | 4/2012 | Moon ................. G11C 7/222 |
| | | 365/233.18 |

(Continued)

FOREIGN PATENT DOCUMENTS

| WO | WO-2006058115 A1 * | 6/2006 | ............. G06F 12/00 |
| WO | WO-2023092224 A1 * | 5/2023 | .......... H02M 1/0095 |

OTHER PUBLICATIONS

"How to Overclock RAM." Intel. Published Jun. 8, 2020. <https://web.archive.org/web/20200608013503/https://www.intel.com/content/www/us/en/gaming/resources/overclock-ram.html>. (Year: 2020).*

(Continued)

*Primary Examiner* — Kenneth M Lo
*Assistant Examiner* — Hewy H Li
(74) *Attorney, Agent, or Firm* — Holland & Hart LLP

(57) ABSTRACT

Methods, systems, and devices for an adjustable periodicity of burst access operations are described. Generally, the described techniques relate to mitigating electromagnetic emissions associated with issuing access commands by adjusting a periodicity according to which the access commands are issued. For example, a first set of one or more commands to perform a first type of access operation may be issued according to a first time delay and a second set of one or more commands to perform the first type of access operation may be issued according to a second time delay, which may be different or the same as the first time delay. The second time delay may be (e.g., randomly) determined based on a value that is selected by a device that issues the commands, the value associated with modifying a periodicity according to which commands to perform the first type of access operation are issued.

19 Claims, 7 Drawing Sheets

(56) References Cited

U.S. PATENT DOCUMENTS

2018/0373314 A1* 12/2018 Stewart .................. G06F 1/3296
2019/0138245 A1* 5/2019 Shin ...................... G06F 3/0611

OTHER PUBLICATIONS

Defiancecp et al. "BCLK Overclocking—Gaming, Stability, and Risk Analysis Request." Reddit. Published May 2018. <https://www.reddit.com/r/Amd/comments/8ihyb5/bclk_overclocking_gaming_stability_and_risk/>. (Year: 2018).*

Olsan, Jan. "Alder Lake and DDR5: XMP 3.0, Dynamic Memory Boost and more." HW Cooling.net. Published Nov. 1, 2021. <https://www.hwcooling.net/en/alder-lake-and-ddr5-xmp-3-0-dynamic-memory-boost-and-more/>. (Year: 2021).*

Maraksot78. "A Beginners Guide: What is XMP? and How to Enable Your RAM's XMP." Youtube. Published Oct. 28, 2020. <https://www.youtube.com/watch?v=WDzrq5lxBX4&t=64s>. (Year: 2020).*

TherealErnesto_.et al. "First serious ram overclock, how did I do?". Reddit. Published May 2022. <https://www.reddit.com/r/overclocking/comments/oc3dix/why_ddr4_tertiary_timings_are_not_on_the_chip/> (Year: 2022).*

* cited by examiner

ADJUSTABLE PERIODICITY OF BURST ACCESS OPERATIONS

CROSS REFERENCE

The present application for patent claims the benefit of U.S. Provisional Patent Application No. 63/478,555 by Gurrala et al., entitled "ADJUSTABLE PERIODICITY OF BURST ACCESS OPERATIONS," filed Jan. 5, 2023, assigned to the assignee hereof, and expressly incorporated by reference herein.

TECHNICAL FIELD

The following relates to one or more systems for memory, including an adjustable periodicity of burst access operations.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
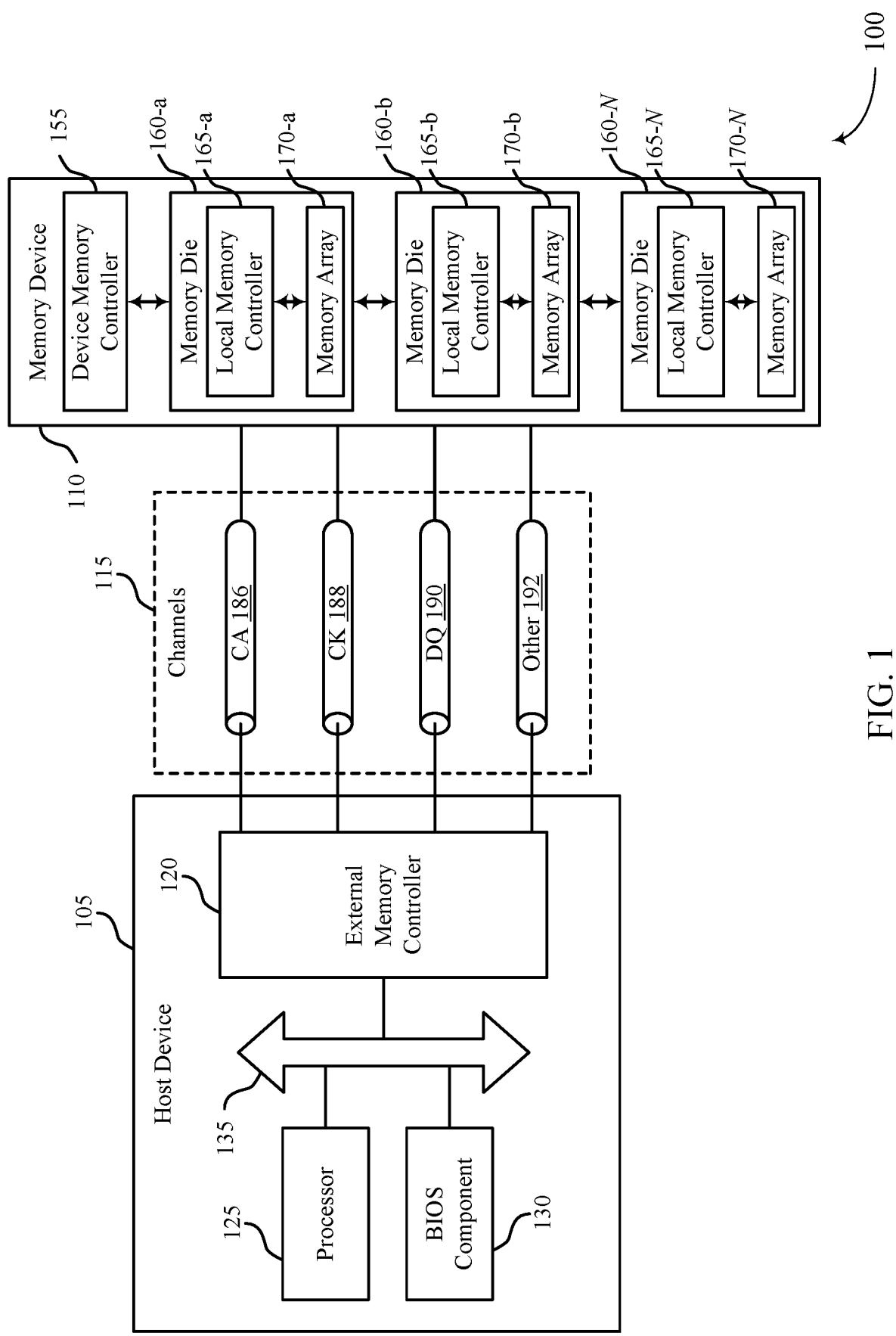
FIG. 1 illustrates an example of a system that supports an adjustable periodicity of burst access operations in accordance with examples as disclosed herein.

A memory device may be provided in accordance with various configurations which support storing or sensing information in memory cells via access operations. In some examples, a device (e.g., a host device or a memory device) may issue access operations (e.g., of a same type) periodically. For example, the device may issue a set of commands to one or more memory dies of the memory device to perform an access operation of a first type (e.g., a read burst operation, a write burst operation, among others). The set of commands may be issued at a periodic interval such that each command is issued after a same time delay after issuance of a prior command of the set of commands. In some examples, the time delay may be referred to as a $t_{CCD}$ delay. In some cases, issuing the commands at the periodic interval may cause relatively high electromagnetic emissions at a frequency corresponding to the periodicity. Additionally, one or more electromagnetic emission peaks may occur at frequencies related to the frequency, such as at harmonics of the frequency. Such emissions may result in electromagnetic interference (EMI) from the memory device, which may impact other devices and/or systems external and proximate to the memory device (e.g., a system including an antenna operating at one or more of the frequencies or over a frequency band that includes one or more of the frequencies).

To support mitigating electromagnetic emissions associated with periodically issuing access commands (e.g., in accordance with a $t_{CCD}$ delay), a device may adjust a periodicity according to which respective sets of access commands (e.g., burst commands) are issued. For example, a first set of commands to perform a first type of access operation may be issued according to a first time delay (e.g., a first periodicity), a second set of commands to perform a second type of access operation may be issued according to a second time delay (e.g., a second periodicity, a periodicity different than the first periodicity), and so on. In some examples, the device may adjust the time delay for a given set of commands based on a value, such as an integer value, that is selected, such as randomly selected, by the device. For example, to update a time delay for an upcoming set of burst commands, the device may select a value from a value set associated with modifying (e.g., adjusting) a periodicity according to which commands to perform the first type of access operation are issued (e.g., modifying a $t_{CCD}$ delay) and may determine the updated time delay using the selected value. In this way, adjustment, such as randomization, of the periodicity according to which the commands are issued may occur. For example, although there may exist a local periodicity according to which a given set of commands are issued, a global periodicity according to which commands to perform the first type of access operation may be randomized (e.g., eliminated). By randomizing command periodicity with respect to different sets of commands, electromagnetic emissions will be distributed across various frequencies (e.g., including harmonic frequencies) rather than concentrated to frequencies corresponding to a single, unmodified periodicity. Thus, electromagnetic emission peaks and EMI at those frequencies will be reduced while maintaining a similar data throughput (e.g., due to the avoidance of adjusting a clock rate associated with the device to move electromagnetic emission peaks).

Features of the disclosure are initially described in the context of a system and a die as described with reference to FIGS. 1 and 2. Features of the disclosure are described in the context of a frequency diagram, a system, and a process flow as described with reference to FIGS. 3 through 5. These and other features of the disclosure are further illustrated by and described with reference to an apparatus diagram and a flowchart that relate to an adjustable periodicity of burst access operations as described with reference to FIGS. 6 and 7.

FIG. 1 illustrates an example of a system 100 that supports an adjustable periodicity of burst access operations in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In accordance with examples described here, the host device 105 (e.g., the external memory controller 120) may reduce electromagnetic emissions associated with the system 100 by periodically and/or dynamically adjusting a periodicity according to which access commands of a same type (e.g., burst commands, such as write burst commands or read burst commands) are issued to the memory device 110. For example, the host device 105 may periodically issue (e.g., via the external memory controller 120) commands to the memory device 110). The memory device 110 may then issue the commands to one or more memory dies 160 to perform access operations on memory cells included in the one or more memory dies 160. The periodicity at which the commands are issued by the host device 105 may be associated with relatively high electromagnetic emissions (e.g., at a frequency associated with the periodicity, harmonics of the frequency, or both). To mitigate such emissions, the host device 105 may randomize a periodicity according to which various sets of commands are issued to the memory device 110. For instance, every N commands issued by the host device 105 (e.g., where Nis an integer value greater than or equal to one), the host device 105 may update a time delay (e.g., a $t_{CCD}$ delay) for issuing the commands by randomly selecting an integer value from a value set. Using the integer value, the host device 105 may determine a new time delay for an upcoming set of commands (e.g., the next set of N commands). In doing so, the host device 105 may reduce electromagnetic emissions associated with issuing commands by randomizing the periodicity at which different sets of commands are issued.

Figure 2:
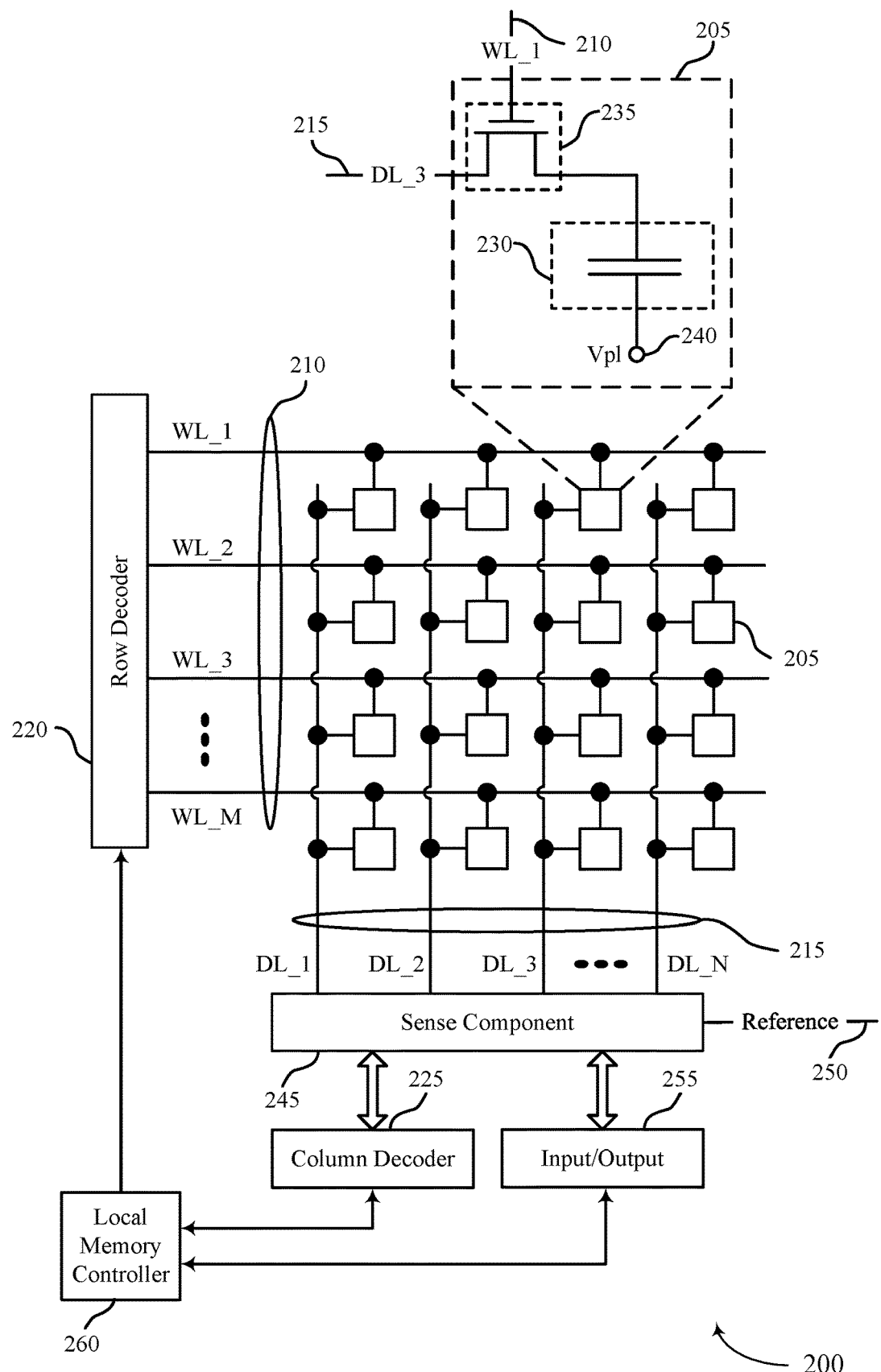
FIG. 2 illustrates an example of a memory die that supports an adjustable periodicity of burst access operations in accordance with examples as disclosed herein.

FIG. 2 illustrates an example of a memory die 200 that supports an adjustable periodicity of burst access operations in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a write burst operation, a read burst operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

In accordance with examples described herein, the memory die 200 may receive access commands to perform one or more access operations of a same type on one or more memory cells 205. In some cases, the commands to perform the same type of access operation may be received, via the local memory controller 260, according to a periodicity. The periodicity at which the commands are received by the local memory controller 260 may be associated with relatively high electromagnetic emissions at the frequency associated with the periodicity, harmonics of the frequency, or both. To mitigate such emissions, a device issuing the commands (e.g., a host device 105) may randomize a respective periodicity according to which various sets of commands are issued. For instance, the host device 105 may update a time delay according to which commands are issued to the local memory controller 260 every N commands by randomly selecting an integer value from a value set and using the integer value to modify the time delay (e.g., a nominal teen value) by an integer multiple of a clock of the memory die 200. As a result, the electromagnetic emissions associated with the commands may be reduced by randomizing the periodicity at which different sets of commands are issued.

Figure 3:
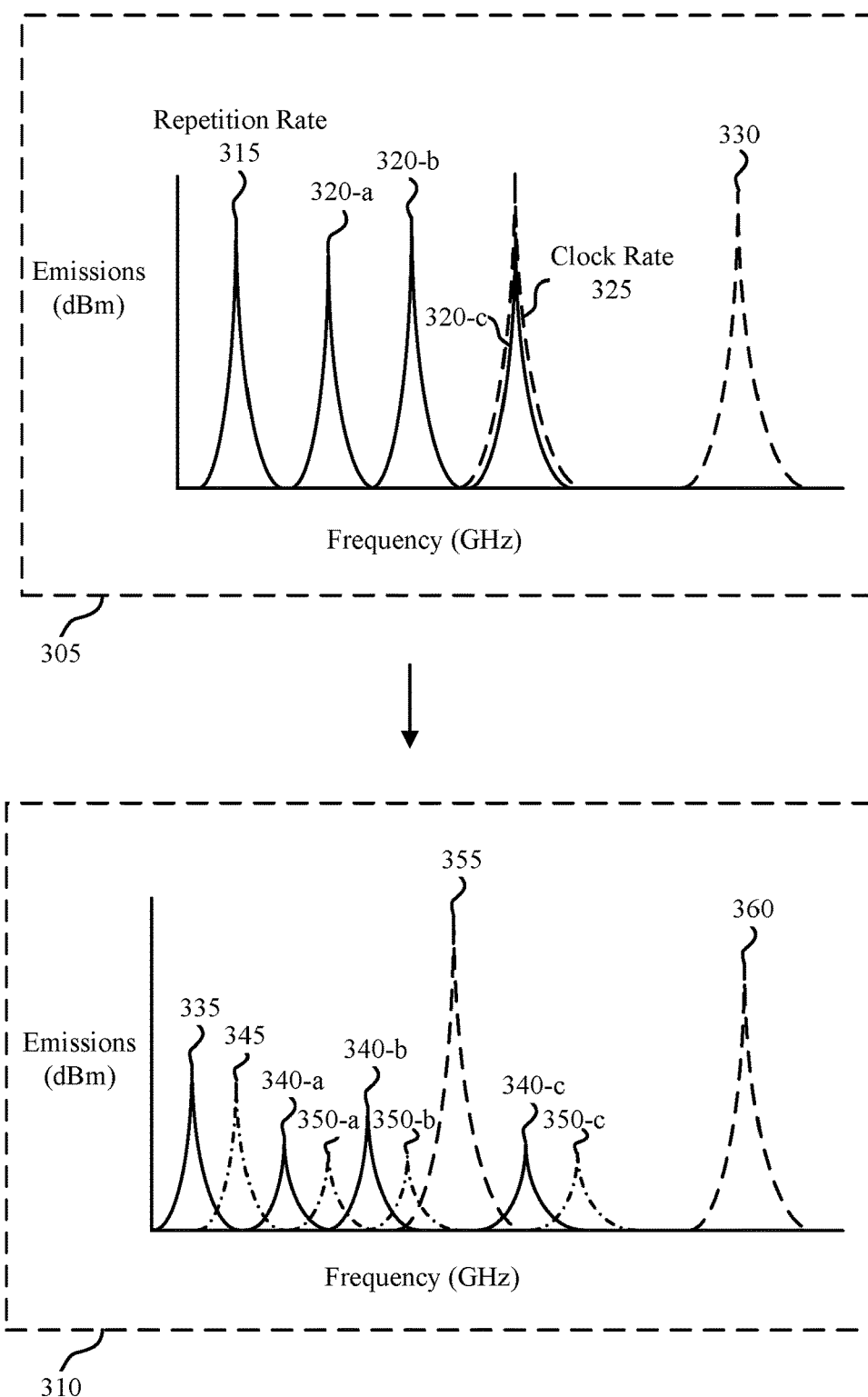
FIG. 3 illustrates an example of a frequency diagram that supports an adjustable periodicity of burst access operations in accordance with examples as disclosed herein.

FIG. 3 illustrates an example of a frequency diagram 300 that supports an adjustable periodicity of burst access operations in accordance with examples as disclosed herein. The frequency diagram 300 may depict electromagnetic emissions associated with issuing access commands from a host device to a memory device, such as a host device 105 and a memory device 110 or memory die 200 described with reference to FIGS. 1 and 2. For example, the frequency diagram 300 may include a first spectrum 305 and a second spectrum 310, which may be examples of electromagnetic emissions associated with issuing access commands with and without randomizing a periodicity according to which different sets of access commands are issued, respectively.

The memory device may support accessing one or more memory cells according to various types of access operations. In some examples, the memory device may support burst access operations in which multiple memory cells may be accessed in response to specifying a starting address. For example, an address of a word line or a bit line may be indicated in a burst command, and each of the memory cells coupled with the word line or bit line may be accessed in response to the burst command (e.g., written to as part of a write burst operation, read from as part of a read burst operation), for example, rather than accessing one memory cell, then sending the next address to access a next memory cell, and so on. In some examples, the memory device may receive access commands (e.g., burst commands) from the host device. The memory device may issue the access commands to a memory die of the memory device to perform one or more access operations on memory cells of the memory die.

The host device may issue the access commands to the memory device at a periodic interval. That is, each access command of a set of access commands may be successively issued after a same time delay. A parameter $t_{CCD}$ may indicate a length of the time delay, which may be an integer multiple of a unit clock interval (nCK) of the memory device, a constant value, or both. For instance, if a clock rate of the memory device is 1600 MHZ (e.g., an nCK of $\frac{1}{1600}$ μs), the access commands may be issued at a burst repetition rate, $t_{CCD}$, of an integer value multiplied by the unit clock interval (e.g., $t_{CCD}=8*nCK$). In some examples, such as when $t_{CCD}$ is a static constant, the periodic signaling of access commands may cause or be otherwise associated with relatively high electromagnetic emissions (e.g., radio frequency emissions) at various frequencies. For example, periodically issuing the access commands and/or performing the corresponding access operations may cause relatively high electromagnetic emissions to occur.

As an example, in the first spectrum 305, a periodicity associated with the interval $t_{CCD}$ may create an emission peak at a repetition rate 315 corresponding to the periodicity. Further, one or more harmonics 320 of the repetition rate 315 may be associated with relatively high emission peaks. For instance, if a digital signal repeats every/seconds, emission peaks may be located at the corresponding frequency and frequency harmonics: that is, at the frequencies given by the expression m/t, where m is any positive integer. For example, time-varying quantities may be represented as a superposition of an infinite number of sine and cosine functions, each with a frequency in $[0,\infty]$, such as according to Equation 1 below:

$$x(t) \approx \sum_{n=0}^{\infty} A_n \cos 2\pi f_n t + B_n \sin 2\pi f_n t \quad (1)$$

The frequency spectrum (e.g., as depicted by the spectrum 305) of a time-varying quantity may represent the strength of its sine and cosine components at each frequency, where the strength y at frequency $f_n$ may be represented in an appropriate physical unit (e.g., in decibel milliwatts (dBm), among others) as $$y = 0.5\sqrt{A_n^2 + B_n^2}.$$

In the example of FIG. 3, a harmonic 320-a, a harmonic 320-b, and a harmonic 320-c may each be associated with an emission peak similar to that of the repetition rate 315 (e.g., with strengths calculated as described above), although any quantity of harmonics 320 may be associated with emission peaks associated with issuing the access commands. For example, for a repetition rate 315 of 250 MHz, the harmonic 320-a may correspond to a frequency of 500 MHZ, the harmonic 320-b may correspond to a frequency of 750 MHZ, the harmonic 320-c may correspond to a frequency of 1 GHZ, and so on (not shown for illustrative clarity). In some cases, a clock rate 325 corresponding to nCK and one or more harmonics 330 of the clock rate 325 may be associated with a relatively high emission peaks. For example, as part of standard operation, the memory device may issue various commands at a periodicity corresponding to the clock rate 325 (e.g., 1 GHz). Additionally, the one or more harmonics 330 of the clock rate 325 (e.g., 2 GHZ, 3 GHZ, and so on) may be associated with relatively high emission peaks. Such emission peaks may result in relatively large EMI at the repetition rate 315, the harmonics 320, the clock rate 325, and the harmonics 330, which may incur adverse effects, such as radio frequency interference on systems external and proximate to the memory device and the host device.

In some examples, the memory device and/or the host device may adjust a signal repetition rate to mitigate EMI by modifying a reference clock rate. However, adjustment of the reference clock rate may maintain similar emission peaks but at a different set of frequencies (e.g., frequencies shifted from the repetition rate 315, the harmonics 320, the clock rate 325, and the harmonics 330 in accordance with the reference clock rate modification). In some examples, if the reference clock rate is decreased (e.g., due to high-speed limitations of the memory device preventing an increase), a bandwidth (e.g., data rate) of the memory device may degrade. For example, decreasing a reference clock rate from 3200 MHZ to 3000 MHz may proportionally reduce a raw data transfer rate of the memory device. Additionally, a fixed quantity of reference clock rates to which the reference clock rate may be adjusted may be specified according to a standard (e.g., joint electron device engineering council (JEDEC) standards), which may be stipulated to lie relatively far apart. Thus, adjusting a reference clock rate may incur a significant data throughput penalty, a degree of which may be static (e.g., constant over time).

To support EMI mitigation while maintaining a similar data throughput, the host device may randomize an interval at which different sets of access commands are issued to the memory device. For example, the host device may issue a first set of commands to perform first access operations of a first type according to a first time delay, issue a second set of commands to perform second access operations of the first type according to a second time delay, and so on. A time delay that is associated with a given set of commands may indicate a duration after issuing each command of the set of commands before a next command may be issued (e.g., a next command of the set of commands, a next command of a next set of commands). For example, the host device may issue commands of the first set of commands after expiration of the first time delay between issuance of respective commands. Additionally, the host device may issue a first command of the second set of commands (e.g., a first command of a next set of commands) after the first time delay following the issuance of a last command of the first set of burst commands. In some cases, the second time delay (e.g., and subsequent time delays) may be different than the first time delay (e.g., a previous time delay). To determine the second time delay, the host device may select an integer value from a set of values associated with modifying the periodicity according to which the commands are issued and may calculate the second time delay according to the selected value (e.g., as a function of the clock rate and a nominal (e.g., minimum) delay value).

The second spectrum 310 may include one or more electromagnetic emission peaks corresponding to a first repetition rate 335, one or more harmonics 340 of the first repetition rate 335 (e.g., a harmonic 340-a, a harmonic 340-b, and a harmonic 340-c), a second repetition rate 345, one or more harmonics 350 of the second repetition rate 345 (e.g., a harmonic 350-a, a harmonic 350-b, and a harmonic 350-c), a clock rate 355, one or more harmonics 360 of the clock rate 355, or any combination thereof. The clock rate 355 may represent a periodicity corresponding to the unit clock rate, nCK, of the memory device (e.g., a data rate), and may be associated with relatively high emissions due to various other signaling and operations of the memory device at the clock rate 355. In some examples, the first repetition rate 335, the second repetition rate 345, the harmonics 340, and the harmonics 350 may be associated with emissions having mitigated (e.g., reduced) magnitudes, which may be due to the randomization of periodic intervals (e.g., time delays) according to which the commands are issued. For example, the first repetition rate 335 may correspond to a first periodicity (e.g., a first time delay) for issuing a first set of commands and the second repetition rate 345 may correspond to a second periodicity (e.g., a second time delay) for issuing a second set of commands Such techniques may distribute emissions across a frequency band while reducing peak emission values (e.g., as opposed to shifting emission peaks). Additionally, a data rate may be relatively unaffected as the clock rate of the memory device may be unchanged, and instead a relatively minor delay (e.g., 1 clock cycle, 2 clock cycles, and so on) may be randomly (e.g., and periodically or dynamically) introduced to mitigate electromagnetic emission peaks.

Figure 4:
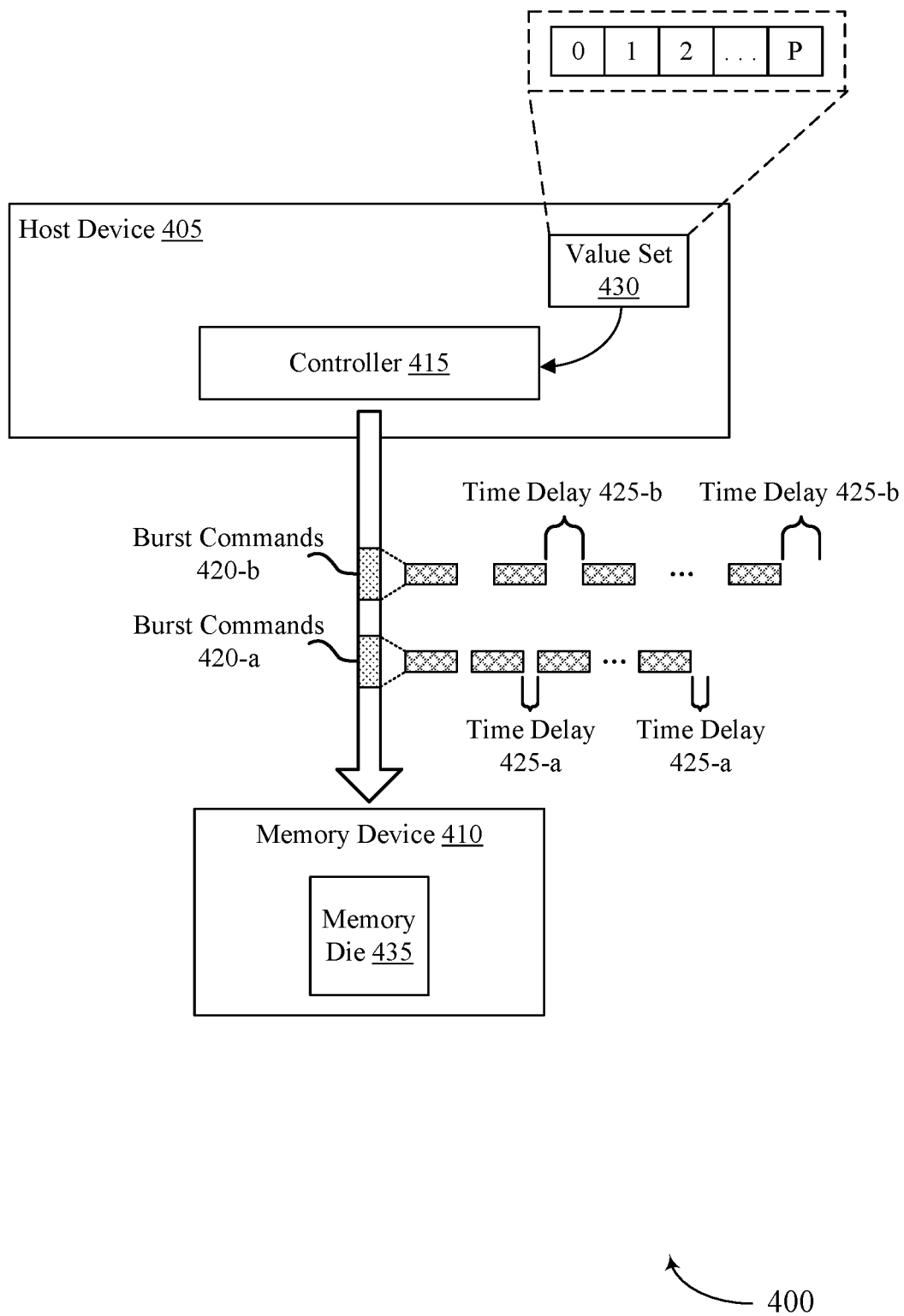
FIG. 4 illustrates an example of a system that supports an adjustable periodicity of burst access operations in accordance with examples as disclosed herein.

FIG. 4 illustrates an example of a system 400 that supports an adjustable periodicity of burst access operations in accordance with examples as disclosed herein. The system 400 may include one or more aspects of the system 100 and the memory die 200. For example, the system 400 may include a host device 405 and a memory device 410, which may be examples of the corresponding devices described herein, including with reference to FIGS. 1 through 3. Additionally, the memory device 410 may include a memory die 435, which may be an example of a memory die 160 or a memory die 200 described with reference to FIG. 1 and FIG. 2, respectively. In some examples, the system 400 may depict the host device 405 issuing, from a controller 415 to the memory device 410, respective sets of one or more burst commands 420 (e.g., commands to perform a write burst operation, commands to perform a read burst operation, although other types of commands to perform other types of access operations are possible).

In some examples, the memory device 410 may receive one or more sets of burst commands 420 from the host device 405 at respective periodicities according to respective time delays 425. For example, the controller 415 may wait for the time delay 425 (e.g., $t_{CCD}$) between issuance (e.g., transmission) of two consecutive commands of an associated set of burst commands 420. For instance, the controller 415 may issue a first set of burst commands 420-a, a second set of burst commands 420-b, and so on. In some cases, the burst commands 420-a may be periodically issued according to a time delay 425-a and the burst commands 420-b may be periodically issued according to a time delay 425-b, which may be different from the time delay 425-a (e.g., adjusted to mitigate electromagnetic emission peaks, as described with reference to FIG. 3). As an example, the burst commands 420-a and the burst commands 420-b may cumulatively include 8 burst commands (e.g., 4 burst commands in the burst commands 420-a and 4 burst commands in the burst commands 420-b), which may correspond to 8 time intervals for issuing the burst commands 420-a and the burst commands 420-b. In such an example, a first 4 time intervals of the 8 time intervals may correspond to the time delay 425-a (e.g., following respective burst commands of the burst commands 420-a), including a time interval following a last command of the burst commands 420-a. A last 4 time interval of the 8 time intervals may correspond to the time delay 425-b (e.g., beginning after a first burst command of the burst commands 420-b), including a time interval following a last command of the burst commands 420-b.

In some examples, the host device 405 may adjust a periodicity for issuing burst commands 420 after a threshold quantity of burst commands 420 are issued (e.g., after N burst commands 420). That is, the host device 405 (e.g., the controller 415) may determine (e.g., select, update, calculate, modify, adjust) a time delay 425 for given set of burst commands 420 every N burst commands 420 that are issued, where N is some positive integer. Additionally, or alternatively, the quantity of burst commands 420 after which a periodicity is to be updated may be variable (e.g., dynamic). That is, the value of N may be adjusted during (e.g., throughout, at various times during) operation of the host device 405 and the memory device 410. As a result, a first quantity of first set of burst commands 420-a may be different than a second quantity of the second set of burst commands 420-b.

To update a periodicity for a set of burst commands 420 (e.g., modify the time delay 425 according to which the set of burst commands 420 are issued), the host device 405 (e.g., the controller 415) may access a value set 430 stored at the host device 405 (e.g., at the controller 415, at processor of the host device 105). The value set 430 may include a quantity of distinct integers (e.g., a set of integers from 0 to P, where P is some positive integer greater than or equal to 1) available for selection by the host device 405. In some cases, the quantity of integers may be variable. That is, the value of P may be adjusted during (e.g., throughout, at various times during) operation of the host device 405 and the memory device 410. For example, increasing a value of P may increase a potential randomization of the periodicity according to which burst commands 420 are issued.

The host device 405 may select an integer value from the value set 430 to determine a time delay 425 for issuing a given set of burst commands 420. For example, after issuing the burst commands 420-a according to the time delay 425-a (e.g., after issuing the threshold quantity of burst commands N), the device may randomly select an integer value, p, from the value set 430. The host device 405 may determine the time delay 425-b according to a function of the selected value, a nominal delay value (e.g., a minimum time delay associated with periodically issuing burst commands 420), the unit clock interval (e.g., nCK), or any combination thereof. For instance, the host device 405 may calculate the time delay 425-b according to an incrementation of the nominal delay value. For example, the host device 405 may increment the nominal delay value by a product of the selected value and the unit clock interval according to Equation 2 below:

$$t_{CCD} = t_0 + p * nCK \qquad (2)$$

Here, $t_{CCD}$ may be the calculated time delay 425 (e.g., time delay 425-b), to may be the minimum time delay, p may be the selected integer value, and nCK may be the unit clock interval associated with the clock of the memory device 410.

In some cases, a random probability distribution of the value set 430 may be adjustable by the device. For example, the host device 405 may adjust a probability of the integer values included in the value set 430 being selected.

By way of example, the value set 430 may include two integers (e.g., P=1 and a set of {0, 1}) with equal probability of selection. The host device 405 may randomly select an integer value after each set of burst commands 420 (e.g., N≥1) and may calculate a respective time delay 425 for the next set of burst commands 420 using the selected integer value, which may mitigate emission peaks across a frequency band. The memory device 410 may receive the burst commands 420 according to the respective time delays 425 and may issue the burst commands to the memory die 435 according to time delays 425 in which the burst commands 420 were received (e.g., according to the respective time delays 425). Additionally, the host device 405 may be operable to adjust the quantity of integer values included in the value set 430, the threshold quantity of burst commands associated with updating the periodicity, the random probability distribution of selecting the integer values included in the value set 430, or any combination thereof. Such techniques may support fine and dynamic control of both emission levels incurred by periodic issuance of burst commands 420 and data throughput of the memory device 410.

By randomizing an adjustable periodicity according to which burst commands 420 of a same type are issued, a global periodicity according to which the burst commands 420 are issued may be randomized (e.g., eliminated), thereby reducing electromagnetic emission peaks and distributing electromagnetic emissions across additional frequencies of a frequency band. For example, while local periodicity of issuing the burst commands 420 may exist within a given set of issued burst commands 420, each respective set of burst commands 420 may be issued according to a randomly calculated time delay 425, thereby randomizing a periodicity according to which burst commands 420 are issued overall.

Figure 5:
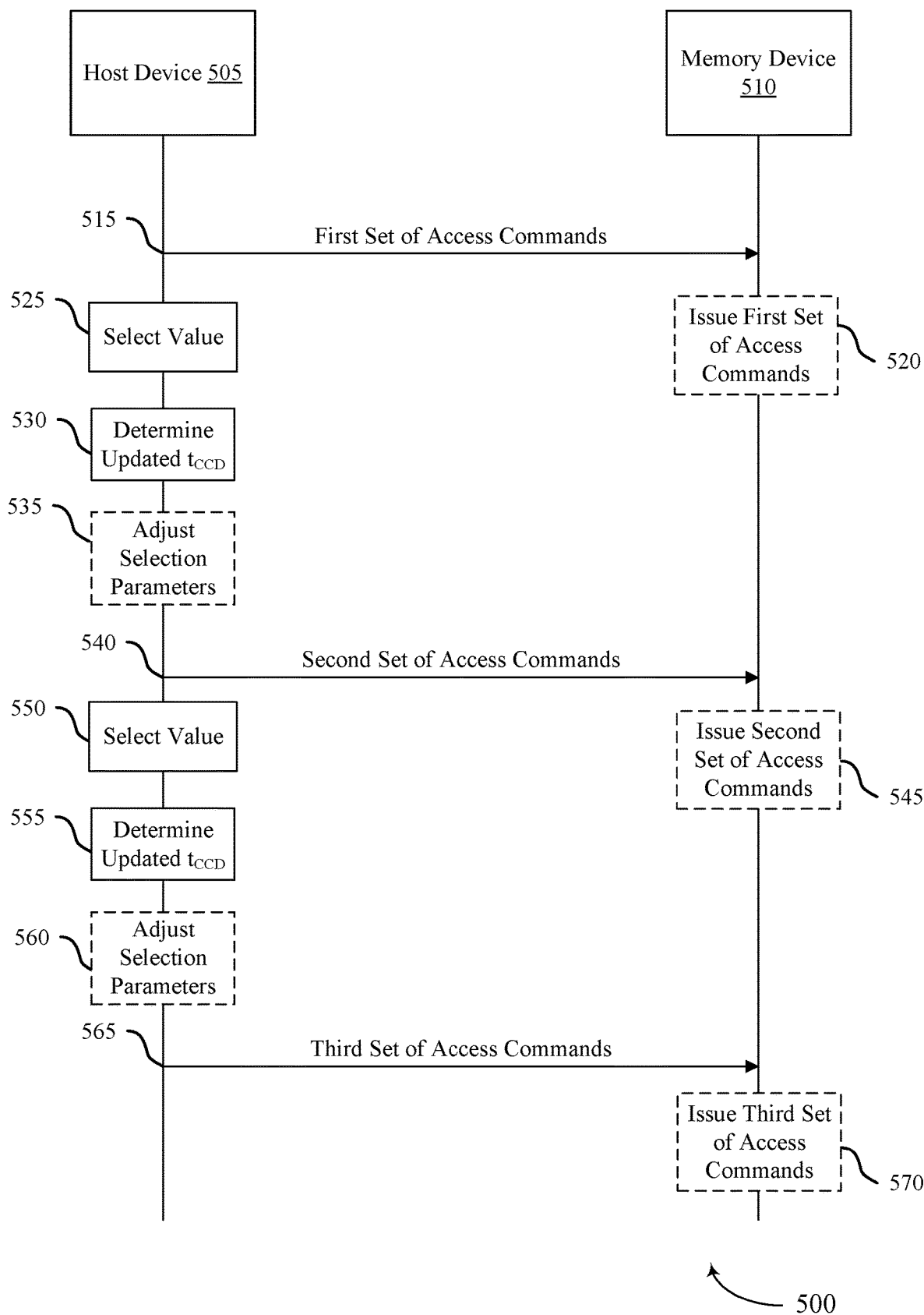
FIG. 5 illustrates an example of a process flow that supports an adjustable periodicity of burst access operations in accordance with examples as disclosed herein.

FIG. 5 illustrates an example of a process flow 500 that supports an adjustable periodicity of burst access operations in accordance with examples as disclosed herein. The process flow 500 may implement one or more aspects of the system 100, the memory die 200, the frequency diagram 300, and the system 400. For example, the process flow 500 may include a host device 505 and a memory device 510, which may be examples of the corresponding devices described herein, including with reference to FIGS. 1 through 4. Additionally, the process flow 500 may illustrate an example of the host device 505 issuing burst commands to the memory device 510 according to varying periodicities in order to mitigate emission peaks, as described with reference to FIG. 3. Alternative examples of the following may be implemented, where some processes are performed in a different order than described or are not performed. In some cases, processes may include additional features not mentioned below; or further processes may be added.

At 515, the host device 505 may issue (e.g., transmit) a first set of one or more access commands (e.g., burst commands) to the memory device 510 (e.g., from a controller of the host device 505). The first set of access commands may be examples of commands to perform access operations of a first type, such as a read burst operation or a write burst operation, among other types of access operations. In some cases, the first set of access commands may be issued according to a first periodicity. For example, each command of the first set of access commands may be periodically issued according to a first time delay (e.g., with respect to a prior command to perform an access command of the first set of access commands). In some examples, the first time delay may correspond to a minimum time delay associated with the periodicity (e.g., a nominal delay value, such as to).

At 520, the memory device 510 may issue the first set of access commands. For example, the memory device 510 may include a controller operable to issue the first set of burst commands to one or more memory dies of the memory device 510. In some cases, the memory device 510 may issue the commands according to the first time delay.

At 525, the host device 505 may select a first value (e.g., integer value) from a set of values (e.g., a value set 430). In some cases, the first value may be selected based on (e.g., after) a quantity of issued commands of the first set of access commands satisfying a threshold quantity (e.g., N commands). The first value may be associated with modifying a periodicity according to which commands to perform access operations of the first type are issued. In some examples, selecting the first value may include randomly selecting the first value from the set of values, where the set of values includes a set of multiple distinct integer values greater than or equal to zero. The selection of the first value may be based on electromagnetic emissions associated with periodically issuing the first set of access commands, periodically performing the corresponding access operations, or both. That is, the selection of the first value to support modifying a periodicity according to which commands are issued may be performed to reduce the electromagnetic emissions.

At 530, the host device 505 may determine an updated delay value, $t_{CCD}$. For example, the host device 505 may determine, based on the first value, a second time delay for issuing a second set of one or more access commands to perform one or more second access operations of the first type. In some cases, determining the second time delay may include calculating the second time delay based on a minimum time delay associated with the periodicity, the first value, and a unit clock interval associated with a clock of the memory device 510. For instance, determining the second time delay may include incrementing the minimum time delay based on the first value, where the second time delay is the incremented minimum time delay. For example, the second time delay may equal the minimum time delay incremented by a product of the first value and the unit clock interval, where the first value is an integer greater than or equal to zero. In some examples, the second time delay may be greater than the minimum time delay (e.g., if an integer value other than 0 is selected).

At 535, the host device 505 may adjust one or more selection parameters for selecting subsequent integer values. For example, the host device 505 may be operable to adjust a quantity of integer values included in the value set (e.g., a value P), the threshold quantity of access commands to trigger updating the delay value (e.g., a value N), a random probability distribution associated with selecting integer values included in the value set, or any combination thereof.

At 540, the host device 505 may issue the second set of one or more access commands to the memory device 510. In some examples, the host device 505 may issue the second set of one or more access commands after expiration of the first time delay after a last command of the first set of one or more access commands is issued by the host device 505. The second set of burst commands may be periodically issued according to the second time delay determined at 530. In some cases, the second set of burst commands may include a quantity of burst commands that is different than the quantity of burst commands included in the first set of burst commands (e.g., based on updating the value of N).

At 545, the memory device 510 may issue the second set of burst commands (e.g., after expiration of the first time delay after the last command of the first set of one or more access commands is issued by the memory device 510). For example, the controller of the memory device 510 may issue the second set of burst commands to the one or more memory dies of the memory device 510. In some cases, the memory device 510 may issue the commands according to the second time delay.

At 550, the host device 505 may select a second value (e.g., integer value) from the value set. The host device 505 may select the second value using the techniques of 525.

At 555, the host device 505 may determine, based on the second value, a third time delay for issuing a third set of one or more access commands to perform one or more third access operations of the first type. The host device 505 may determine the third time delay using the techniques of 530.

At 560, the host device 505 may adjust one or more selection parameters using the techniques of 535.

At 565, the host device 505 may issue the third set of one or more access commands according to the third time delay to the memory device 510.

At 570, the memory device 510 may issue the third set of burst commands. For example, the controller of the memory device 510 may issue the third set of burst commands to the one or more memory dies of the memory device 510. In some cases, the memory device 510 may issue the commands according to the third time delay.

In some examples, different types of access commands may be associated with respective time delays, value sets, threshold quantities of access commands associated with adjusting time delays, random distributions for selecting integer values of the respective value sets, or any combination thereof. For example, if the first type of access operation corresponds to a write burst operation, the host device 505 may perform similar techniques to periodically issue access commands to perform read burst operations according to adjustable time delays using a different set of parameters. For instance, the host device 505 may issue a fourth set of one or more access commands to perform read burst operations according to a time delay associated with issuing read burst operations (e.g., $t_{CCD\_R}$). The fourth set of access commands may include a threshold quantity of access commands (e.g., $N_R$) after which the host device 505 may randomly select an integer value from a value set associated with modifying a periodicity according to which commands to perform read burst operations are issued and may calculate an updated time delay for issuing a next set of one or more access commands to perform the read burst operations.

Figure 6:
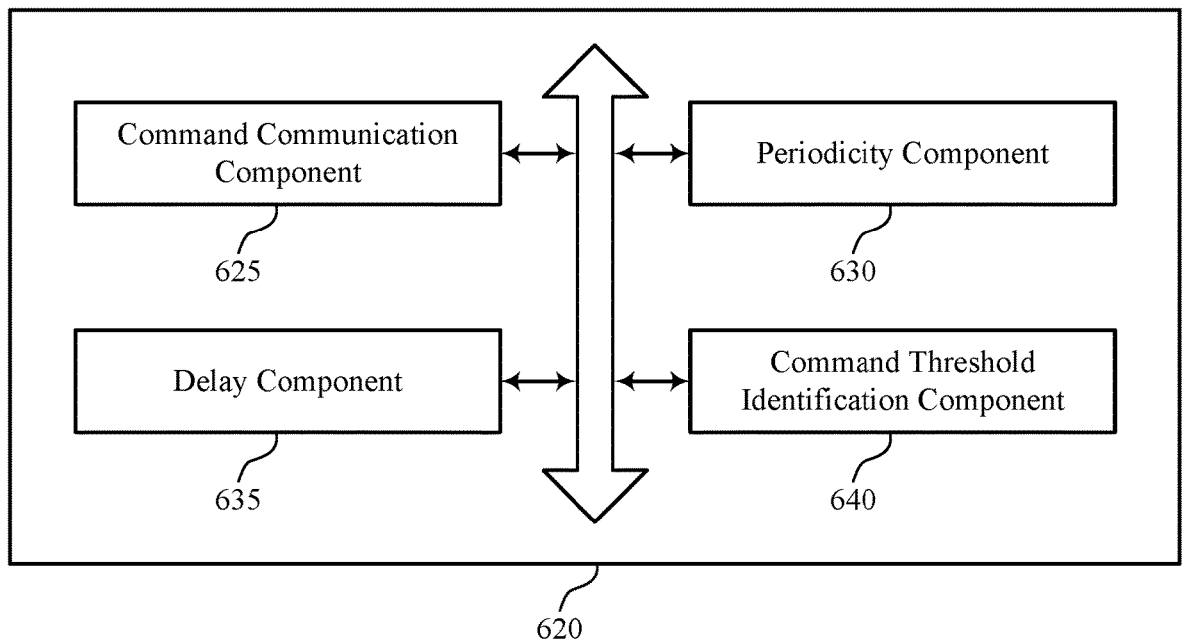
FIG. 6 illustrates a block diagram of a memory device that supports an adjustable periodicity of burst access operations in accordance with examples as disclosed herein.

FIG. 6 illustrates a block diagram 600 of a memory device 620 that supports an adjustable periodicity of burst access operations in accordance with examples as disclosed herein. The memory device 620 may be an example of aspects of a memory device as described with reference to FIGS. 1 through 5. The memory device 620, or various components thereof, may be an example of means for performing various aspects of an adjustable periodicity of burst access operations as described herein. For example, the memory device 620 may include a command communication component 625, a periodicity component 630, a delay component 635, a command threshold identification component 640, or any combination thereof. Each of these components may communicate, directly or indirectly, with one another (e.g., via one or more buses).

The command communication component 625 may be configured as or otherwise support a means for issuing, from a controller associated with a memory device, one or more first commands to perform one or more first access operations of a first type, where each command of the one or more first commands is periodically issued according to a first time delay. The periodicity component 630 may be configured as or otherwise support a means for selecting a first value from a set of values associated with modifying a periodicity according to which commands to perform access operations of the first type are issued. The delay component 635 may be configured as or otherwise support a means for determining, based on the first value, a second time delay for one or more second commands to perform one or more second access operations of the first type. In some examples, the command communication component 625 may be configured as or otherwise support a means for issuing, from the controller, the one or more second commands periodically according to the second time delay.

In some examples, to support determining the second time delay, the delay component 635 may be configured as or otherwise support a means for calculating the second time delay based on a minimum time delay associated with the periodicity, the first value, and a unit clock interval associated with a clock of the memory device.

In some examples, to support determining the second time delay, the delay component 635 may be configured as or otherwise support a means for incrementing a minimum time delay associated with the periodicity based on the first value, where the second time delay is the incremented minimum time delay.

In some examples, to support incrementing the minimum time delay, the delay component 635 may be configured as or otherwise support a means for incrementing the minimum time delay by a product of the first value and a unit clock interval associated with a clock of the memory device, where the first value is an integer greater than or equal to zero.

In some examples, to support selecting the first value, the command threshold identification component 640 may be configured as or otherwise support a means for selecting the first value based on (e.g., after) a first quantity of the one or more first commands being issued satisfying a threshold quantity.

In some examples, the one or more first commands include a first quantity of commands and the one or more second commands include a second quantity of commands that is different from the first quantity of commands.

In some examples, to support selecting the first value, the periodicity component 630 may be configured as or otherwise support a means for randomly selecting the first value from the set of values, where the set of values includes a plurality of distinct integer values greater than or equal to zero.

In some examples, selecting the first value is based on electromagnetic emissions associated with periodically issuing the one or more first commands to perform access operations of the first type.

In some examples, the periodicity component 630 may be configured as or otherwise support a means for selecting a second value from the set of values. In some examples, the delay component 635 may be configured as or otherwise support a means for determining, based on the second value, a third time delay for one or more third commands to perform one or more third access operations of the first type. In some examples, the command communication component 625 may be configured as or otherwise support a means for issuing, from the controller, the one or more third commands periodically according to the third time delay.

In some examples, the command communication component 625 may be configured as or otherwise support a means for issuing, from the controller, one or more third commands to perform one or more third access operations of a second type, where each command of the one or more third commands is periodically issued according to a third time delay. In some examples, the periodicity component 630 may be configured as or otherwise support a means for selecting a second value from a second set of values associated with modifying a periodicity according to which commands to perform access operations of the second type are issued. In some examples, the delay component 635 may be configured as or otherwise support a means for determining, based on the second value, a fourth time delay for one or more fourth commands to perform one or more fourth access operations of the second type. In some examples, the command communication component 625 may be configured as or otherwise support a means for issuing, from the controller, the one or more fourth commands periodically according to the fourth time delay.

In some examples, the first time delay corresponds to a minimum time delay associated with the periodicity, and the second time delay is greater than the minimum time delay.

In some examples, an access operation of the first type is a write burst operation or a read burst operation.

Figure 7:
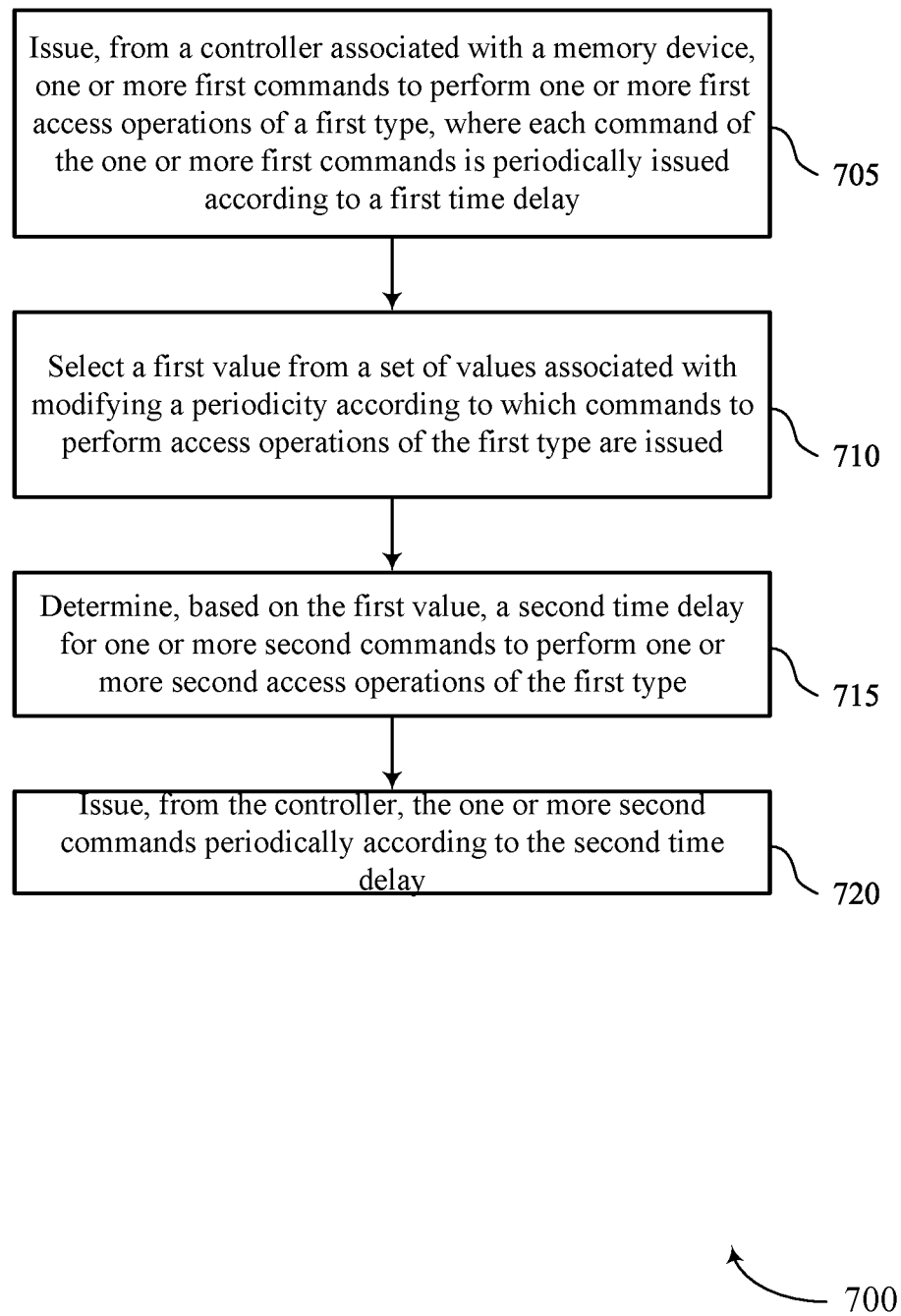
FIG. 7 illustrates a flowchart showing a method or methods that support an adjustable periodicity of burst access operations in accordance with examples as disclosed herein.

FIG. 7 illustrates a flowchart showing a method 700 that supports an adjustable periodicity of burst access operations in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 705, the method may include issuing, from a controller associated with a memory device, one or more first commands to perform one or more first access operations of a first type, where each command of the one or more first commands is periodically issued according to a first time delay. The operations of 705 may be performed in accordance with examples as disclosed herein. In some examples, aspects of the operations of 705 may be performed by a command communication component 625 as described with reference to FIG. 6.

At 710, the method may include selecting a first value from a set of values associated with modifying a periodicity according to which commands to perform access operations of the first type are issued. The operations of 710 may be performed in accordance with examples as disclosed herein. In some examples, aspects of the operations of 710 may be performed by a periodicity component 630 as described with reference to FIG. 6.

At 715, the method may include determining, based on the first value, a second time delay for one or more second commands to perform one or more second access operations of the first type. The operations of 715 may be performed in accordance with examples as disclosed herein. In some examples, aspects of the operations of 715 may be performed by a delay component 635 as described with reference to FIG. 6.

At 720, the method may include issuing, from the controller, the one or more second commands periodically according to the second time delay. The operations of 720 may be performed in accordance with examples as disclosed herein. In some examples, aspects of the operations of 720 may be performed by a command communication component 625 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for issuing, from a controller associated with a memory device, one or more first commands to perform one or more first access operations of a first type, where each command of the one or more first commands is periodically issued according to a first time delay; selecting a first value from a set of values associated with modifying a periodicity according to which commands to perform access operations of the first type are issued; determining, based on the first value, a second time delay for one or more second commands to perform one or more second access operations of the first type: and issuing, from the controller, the one or more second commands periodically according to the second time delay.

Aspect 2: The method, apparatus, or non-transitory computer-readable medium of aspect 1, where determining the second time delay includes operations, features, circuitry, logic, means, or instructions, or any combination thereof for calculating the second time delay based on a minimum time delay associated with the periodicity, the first value, and a unit clock interval associated with a clock of the memory device.

Aspect 3: The method, apparatus, or non-transitory computer-readable medium of any of aspects 1 through 2, where determining the second time delay includes operations, features, circuitry, logic, means, or instructions, or any combination thereof for incrementing a minimum time delay associated with the periodicity based on the first value, where the second time delay is the incremented minimum time delay.

Aspect 4: The method, apparatus, or non-transitory computer-readable medium of aspect 3, where incrementing the minimum time delay includes operations, features, circuitry, logic, means, or instructions, or any combination thereof for incrementing the minimum time delay by a product of the first value and a unit clock interval associated with a clock of the memory device, where the first value is an integer greater than or equal to zero.

Aspect 5: The method, apparatus, or non-transitory computer-readable medium of any of aspects 1 through 4, where selecting the first value includes operations, features, circuitry, logic, means, or instructions, or any combination thereof for selecting the first value based on (e.g., after) a first quantity of the one or more first commands being issued satisfying a threshold quantity.

Aspect 6: The method, apparatus, or non-transitory computer-readable medium of any of aspects 1 through 5, where the one or more first commands include a first quantity of commands and the one or more second commands include a second quantity of commands that is different from the first quantity of commands.

Aspect 7: The method, apparatus, or non-transitory computer-readable medium of any of aspects 1 through 6, where selecting the first value includes operations, features, circuitry, logic, means, or instructions, or any combination thereof for randomly selecting the first value from the set of values, where the set of values includes a plurality of (e.g., distinct) integer values greater than or equal to zero.

Aspect 8: The method, apparatus, or non-transitory computer-readable medium of any of aspects 1 through 7, where selecting the first value is based on electromagnetic emissions associated with periodically issuing the one or more first commands to perform access operations of the first type.

Aspect 9: The method, apparatus, or non-transitory computer-readable medium of any of aspects 1 through 8, further including operations, features, circuitry, logic, means, or instructions, or any combination thereof for selecting a second value from the set of values; determining, based on the second value, a third time delay for one or more third commands to perform one or more third access operations of the first type: and issuing, from the controller, the one or more third commands periodically according to the third time delay.

Aspect 10: The method, apparatus, or non-transitory computer-readable medium of any of aspects 1 through 9, further including operations, features, circuitry, logic, means, or instructions, or any combination thereof for issuing, from the controller, one or more third commands to perform one or more third access operations of a second type, where each command of the one or more third commands is periodically issued according to a third time delay: selecting a second value from a second set of values associated with modifying a periodicity according to which commands to perform access operations of the second type are issued: determining, based on the second value, a fourth time delay for one or more fourth commands to perform one or more fourth access operations of the second type: and issuing, from the controller, the one or more fourth commands periodically according to the fourth time delay.

Aspect 11: The method, apparatus, or non-transitory computer-readable medium of any of aspects 1 through 10, where the first time delay corresponds to a minimum time delay associated with the periodicity, and the second time delay is greater than the minimum time delay.

Aspect 12: The method, apparatus, or non-transitory computer-readable medium of any of aspects 1 through 11, where an access operation of the first type is a write burst operation or a read burst operation.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 13: An apparatus, including: a controller coupled with a memory device and configured to cause the apparatus to: issue, from the controller, one or more first commands to perform one or more first access operations of a first type, where each command of the one or more first commands is periodically issued according to a first time delay: select a first value from a set of values associated with modifying a periodicity according to which commands to perform access operations of the first type are issued; determine, based on the first value, a second time delay for one or more second commands to perform one or more second access operations of the first type: and issue, from the controller, the one or more second commands periodically according to the second time delay.

Aspect 14: The apparatus of aspect 13, where, to determine the second time delay, the controller is configured to cause the apparatus to: calculate the second time delay based on a minimum time delay associated with the periodicity, the first value, and a unit clock interval associated with a clock of the apparatus.

Aspect 15: The apparatus of any of aspects 13 through 14, where, to determine the second time delay, the controller is configured to cause the apparatus to: increment a minimum time delay associated with the periodicity based on the first value, where the second time delay is the incremented minimum time delay.

Aspect 16: The apparatus of aspect 15, where, to increment the minimum time delay, the controller is configured to cause the apparatus to: increment the minimum time delay by a product of the first value and a unit clock interval associated with a clock of the apparatus, where the first value is an integer greater than or equal to zero.

Aspect 17: The apparatus of any of aspects 13 through 16, where, to select the first value, the controller is configured to cause the apparatus to: select the first value based on (e.g., after) a first quantity of the one or more first commands being issued satisfying a threshold quantity.

Aspect 18: The apparatus of any of aspects 13 through 17, where the one or more first commands include a first quantity of commands and the one or more second commands include a second quantity of commands that is different than the first quantity of commands.

Aspect 19: The apparatus of any of aspects 13 through 18, where, to select the first value, the controller is configured to cause the apparatus to: randomly select the first value from the set of values, where the set of values includes a plurality of distinct integer values greater than or equal to zero.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
issuing, from a controller associated with a memory device, one or more first commands to perform one or more first access operations of a first type, wherein each command of the one or more first commands is periodically issued according to a first time delay;
selecting, based on electromagnetic emissions associated with periodically issuing the one or more first commands to perform access operations of the first type, a first value from a set of values associated with modifying a periodicity according to which commands to perform access operations of the first type are issued;
determining, based on the first value, a second time delay for one or more second commands to perform one or more second access operations of the first type; and
issuing, from the controller, the one or more second commands periodically according to the second time delay.

2. The method of claim 1, wherein determining the second time delay comprises:
calculating the second time delay based on a minimum time delay associated with the periodicity, the first value, and a unit clock interval associated with a clock of the memory device.

3. The method of claim 1, wherein determining the second time delay comprises:
incrementing a minimum time delay associated with the periodicity based on the first value, wherein the second time delay is the incremented minimum time delay.

4. The method of claim 3, wherein incrementing the minimum time delay comprises:
incrementing the minimum time delay by a product of the first value and a unit clock interval associated with a clock of the memory device, wherein the first value is an integer greater than or equal to zero.

5. The method of claim 1, wherein selecting the first value comprises:
selecting the first value based on a first quantity of the one or more first commands being issued satisfying a threshold quantity.

6. The method of claim 1, wherein the one or more first commands comprise a first quantity of commands and the one or more second commands comprise a second quantity of commands that is different from the first quantity of commands.

7. The method of claim 1, wherein selecting the first value comprises:
randomly selecting the first value from the set of values, wherein the set of values comprises a plurality of distinct integer values greater than or equal to zero.

8. The method of claim 1, further comprising:
selecting a second value from the set of values;
determining, based on the second value, a third time delay for one or more third commands to perform one or more third access operations of the first type; and
issuing, from the controller, the one or more third commands periodically according to the third time delay.

9. The method of claim 1, further comprising:
issuing, from the controller, one or more third commands to perform one or more third access operations of a second type, wherein each command of the one or more third commands is periodically issued according to a third time delay;
selecting a second value from a second set of values associated with modifying a periodicity according to which commands to perform access operations of the second type are issued;
determining, based on the second value, a fourth time delay for one or more fourth commands to perform one or more fourth access operations of the second type; and
issuing, from the controller, the one or more fourth commands periodically according to the fourth time delay.

10. The method of claim 1, wherein the first time delay corresponds to a minimum time delay associated with the periodicity, and the second time delay is greater than the minimum time delay.

11. The method of claim 1, wherein an access operation of the first type is a write burst operation or a read burst operation.

12. An apparatus, comprising:
a controller coupled with a memory device and configured to cause the apparatus to:
issue, from the controller, one or more first commands to perform one or more first access operations of a first type, wherein each command of the one or more first commands is periodically issued according to a first time delay;
select, based on electromagnetic emissions associated with periodically issuing the one or more first commands to perform access operations of the first type, a first value from a set of values associated with modifying a periodicity according to which commands to perform access operations of the first type are issued;
determine, based on the first value, a second time delay for one or more second commands to perform one or more second access operations of the first type; and
issue, from the controller, the one or more second commands periodically according to the second time delay.

13. The apparatus of claim 12, wherein, to determine the second time delay, the controller is configured to cause the apparatus to:
calculate the second time delay based on a minimum time delay associated with the periodicity, the first value, and a unit clock interval associated with a clock of the apparatus.

14. The apparatus of claim 12, wherein, to determine the second time delay, the controller is configured to cause the apparatus to:
increment a minimum time delay associated with the periodicity based on the first value, wherein the second time delay is the incremented minimum time delay.

15. The apparatus of claim 14, wherein, to increment the minimum time delay, the controller is configured to cause the apparatus to:
increment the minimum time delay by a product of the first value and a unit clock interval associated with a clock of the apparatus, wherein the first value is an integer greater than or equal to zero.

16. The apparatus of claim 12, wherein, to select the first value, the controller is configured to cause the apparatus to:
select the first value based on a first quantity of the one or more first commands being issued satisfying a threshold quantity.

17. The apparatus of claim 12, wherein the one or more first commands comprise a first quantity of commands and the one or more second commands comprise a second quantity of commands that is different from the first quantity of commands.

18. The apparatus of claim 12, wherein, to select the first value, the controller is configured to cause the apparatus to:
   randomly select the first value from the set of values, wherein the set of values comprises a plurality of distinct integer values greater than or equal to zero.

19. A non-transitory computer-readable medium storing code, the code comprising instructions executable by a processor to:
   issue, from a controller associated with a memory device, one or more first commands to perform one or more first access operations of a first type, wherein each command of the one or more first commands is periodically issued according to a first time delay;
   select, based on electromagnetic emissions associated with periodically issuing the one or more first commands to perform access operations of the first type, a first value from a set of values associated with modifying a periodicity according to which commands to perform access operations of the first type are issued;
   determine, based on the first value, a second time delay for one or more second commands to perform one or more second access operations of the first type; and
   issue, from the controller, the one or more second commands periodically according to the second time delay.

\* \* \* \* \*